April 17, 1956
H. J. MURPHY
2,742,072
STUD AND SOCKET ASSEMBLY HAVING
RESILIENT DETENT LOCKING MEANS
Filed June 7, 1952
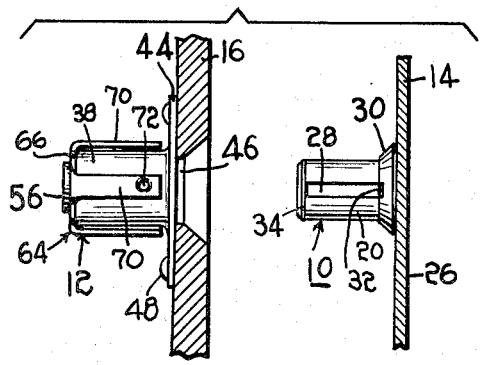
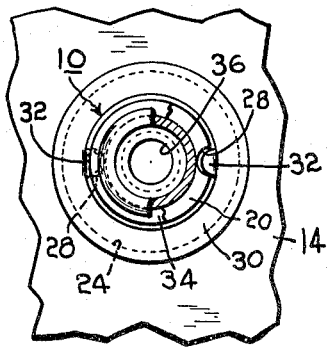
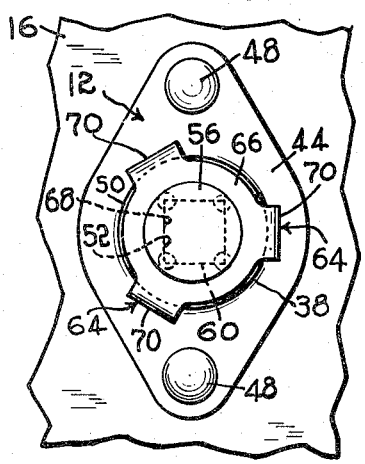
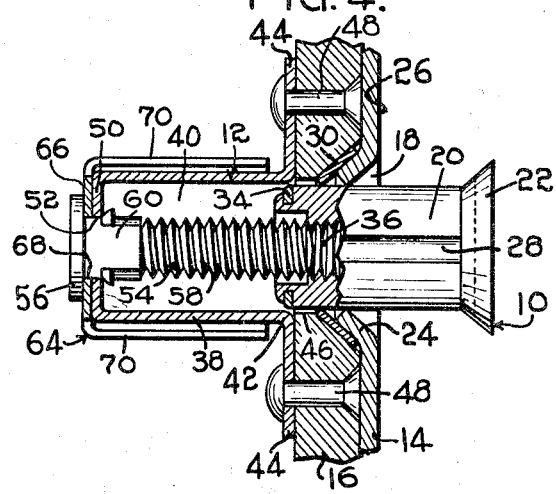
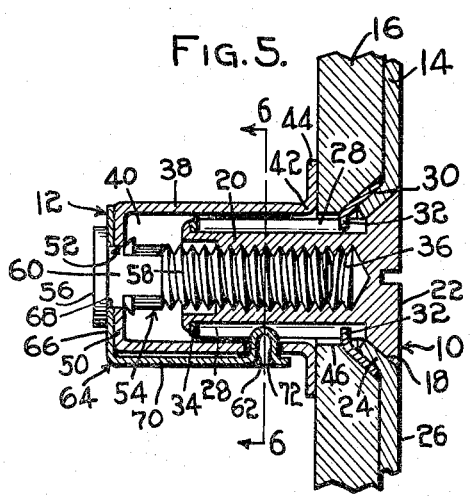
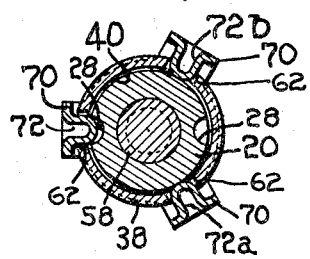
INVENTOR:
HOWARD J. MURPHY,
BY *Robert E Ross*
AGENT.

United States Patent Office 2,742,072
Patented Apr. 17, 1956

2,742,072

STUD AND SOCKET ASSEMBLY HAVING RESILIENT DETENT LOCKING MEANS

Howard J. Murphy, Lynnfield, Mass., assignor, by mesne assignments, to United-Carr Fastener Corporation, Boston, Mass., a corporation of Delaware Application June 7, 1952, Serial No. 292,253

1 Claim. (Cl. 151—9)

This invention relates generally to fastening devices, and has particular reference to a high strength panel fastener for securing superimposed panels of aircraft or the like.

In the construction of aircraft for travel at extremely high speeds, it has been found desirable to design the airframe so that the outer sheet metal covering provides part of the structural strength thereof. Such sheet metal covering must necessarily be provided with panels to allow access to apparatus inside the airframe, and the panels must be capable of being rapidly removed and replaced. However, since the panels, when in place, provide a portion of the structural strength of the airframe, the fastening means used must be exceedingly strong and reliable. This is particularly true in the case of aircraft designed to operate at speeds approaching or exceeding the speed of sound, since at such speeds considerable shear stress may be produced between the panel and the main body of the airframe. In such aircraft, the sheet metal covering and the panels are formed of relatively thick metal, resulting in an exceedingly stiff structure. Consequently, a fastener for attaching such panels must have the sufficient strength to pull the stiff panels tightly together, and must be designed to have a relatively large amount of tolerance to enable it to pull slightly misformed panels into place, and to accommodate panels having variations in thickness, and it is the object of this invention to provide an improved fastener which satisfies these requirements.

In the drawing:

Fig. 1 is a view in elevation of a stud and socket embodying the features of the invention;

Fig. 2 is a view of the stud member of Fig. 1 as seen from the left end;

Fig. 3 is a view of the socket member of Fig. 1 as seen from the left end;

Fig. 4 is a view in section of the stud and socket in position for assembly;

Fig. 5 is a view in section of the stud and socket in assembled relation; and

Fig. 6 is a view in section taken on line 6—6 of Fig. 5.

Referring to the drawing, there is illustrated a fastening device comprising a stud 10 and a socket 12, for assembly with panels 14 and 16 respectively which are to be assembled in superimposed relation.

The stud 10 is assembled into an opening 18 in the panel 14, and comprises an elongated body 20 having a head 22 of generally conical shape to fit into generally a conical portion 24 of the panel about the opening, so that the head 22 will be flush with the outer surface 26 of the panel after assembly. To retain the stud in assembly in the opening 18, a pair of longitudinal grooves 28 are provided in the outer surface of the stud, and a retaining ring 30 having tongues 32 for entering the grooves 28 is assembled onto the stud on the side of the panel 14 opposite the head 22. To retain the ring 30 on the stud, a washer 34 is assembled onto the end of the stud opposite the head to close the ends of the grooves. The ring 30 is longitudinally movable on the elongated body of the stud, so that the stud is movable axially in the opening 18 for a purpose to appear hereinafter. The stud is also provided with a centrally disposed threaded opening 36 extending to the end opposite the head for engagement with a portion of the socket in a manner to be hereinafter described.

The socket 12 comprises an elongated hollow body 38 having an interior substantially cylindrical cavity 40 which opens to one end 42 of the socket body, and said end 42 is provided with a flange 44 with suitable openings to enable the body to be attached to the panel 16 opposite an opening 46 therein by means of rivets 48 or the like. The end of the socket body opposite the end attached to the panel is provided with a base 50 having a square opening 52, and a bolt 54 is assembled in the opening so that the head 56 of the bolt is outside the body and the threaded portion 58 extends longitudinally in the cavity 40 toward the open end 42 of the socket body. The bolt 54 is provided with a squared shank portion 60 disposed in the square opening 52 so that the bolt is non-rotatable in the opening, and is retained therein by any convenient means, such as by deforming the corners of the squared portion.

To impart a friction lock means to the device, a series of apertures 62 are provided about the periphery of the socket body which extend into the cavity, and a locking member 64 is assembled onto the outside of the body. The locking member 64 comprises a base 66 having a square opening 68 assembled onto the end of the socket under the head 56 of the bolt, with the squared portion of the bolt being disposed in the square opening 68 of the base so that the locking member is non-rotatable in relation to the bolt and the socket body. A series of arms 70, 70a and 70b extend from the base toward the apertures alongside the socket body, and are provided with locking portions 72, 72a and 72b respectively which extend through the apertures 62 into the cavity 40 a predetermined distance for a purpose to appear hereinafter.

To assemble the stud and socket, the panels are superimposed as illustrated in Fig. 4, so that the end of the stud may enter the socket and the end of the bolt may enter the end of the central opening of the stud. The stud may then be rotated so that it advances into the socket as the bolt screws into the central opening of the socket.

When the stud has advanced onto the bolt and into the socket a predetermined distance, the portions 72, 72a and 72b of the locking member are flexed outwardly by engagement with the outer periphery of the stud, and as the stud rotates, said locking portions snap into and out of the longitudinal grooves 28 in the stud. Since two grooves and three locking portions 72 are provided in the illustrated embodiment, there are six positions in which a locking portion will be seated in a groove. When the stud is being tightened in the socket, it is possible to stop the rotation of the stud in a tightened position with one of the locking portions 72 seated in one of the grooves 28, so that the stud will be prevented from any tendency to loosen due to vibration in the panels (see Figs. 5 and 6).

An advantage of the illustrated construction is that when the panels are superimposed prior to assembly, the stud can move longitudinally in its opening so that the end opposite the head can become substantially flush with the panel 14, thereby allowing the panels to come completely together before any engagement of the stud with the bolt. This is advantageous in the case of large panels, where a great number of fasteners are used and also permits one fastener to be tightened before the other fasteners on the same panel are engaged.

The fastener also permits a large amount of drawdown to be applied to the panels as is frequently necessary in the case of warped panels, and provides an extremely strong attachment by reason of the length of the threaded engagement between the bolt and the stud.

Since certain modifications may be made in the device without departing from the scope of the invention, it is intended that all matter contained herein be interpreted in an illustrative and not a limiting sense.

I claim:

A fastening device for joining superimposed panels or the like, comprising a socket member having laterally extending means for attachment to one panel to dispose the socket opposite an opening therein, and a stud member for assembly into an opening in the other panel, said socket comprising an elongated hollow body with an opening in one end, and a base at the other end with a bolt mounted therein and extending toward the socket opening, said stud member comprising an elongated body adapted to enter the socket, said stud having a threaded aperture in the end to receive the bolt, and having a series of longitudinal grooves disposed in the outer surface, said socket having a series of apertures disposed about the periphery which extend to the interior of the socket, and a locking member having a base on the end of the body and flexible arms extending therefrom alongside the socket and having portions extending through the apertures for snapping into and out of the longitudinal grooves in the stud during rotation of the members relative to each other.

References Cited in the file of this patent

UNITED STATES PATENTS

| | | |
|---|---|---|
| 1,168,613 | Eberly | Jan. 18, 1916 |
| 1,289,867 | Moore | Dec. 31, 1918 |
| 2,082,228 | Stoll | June 1, 1937 |
| 2,331,489 | Matsumoto | Oct. 12, 1943 |
| 2,342,170 | Tinnerman | Feb. 22, 1944 |
| 2,380,240 | Hufferd | July 10, 1945 |
| 2,561,459 | Black | July 24, 1951 |
| 2,667,200 | Bedford | Jan. 26, 1954 |

FOREIGN PATENTS

| | | |
|---|---|---|
| 588,215 | Great Britain | May 16, 1947 |